(12) United States Patent
Buell et al.

(10) Patent No.: US 6,773,077 B2
(45) Date of Patent: Aug. 10, 2004

(54) LIGHTWEIGHT MOTORCYCLE WHEEL

(75) Inventors: Erik F. Buell, Mukwonago, WI (US); Vance C. Strader, New Berlin, WI (US); Abraham Askenazi, Burlington, WI (US); Julian A. Galgoczy, N. Kingstown, RI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/902,547

(22) Filed: Jul. 10, 2001

(65) Prior Publication Data

US 2003/0011238 A1 Jan. 16, 2003

(51) Int. Cl.[7] ................................................ B60B 1/06
(52) U.S. Cl. .................. 301/104; 301/6.9; 301/64.101; 301/79; D12/207
(58) Field of Search ........................ 301/55, 57, 65–67, 301/64.101, 64.701, 64.704, 64.705, 73–74, 78–80, 84–85, 95.101, 95.102, 104, 105.1, 6.1, 6.9, 64.102; D12/209, 207, 208; 188/218 XL

(56) References Cited

U.S. PATENT DOCUMENTS

| | | | | |
|---|---|---|---|---|
| 302,954 A | * | 8/1884 | Stephens ..................... | 474/196 |
| 704,234 A | * | 7/1902 | Brunnemer .................. | 301/73 |
| 1,502,759 A | * | 7/1924 | Wade .......................... | 301/65 |
| 1,588,494 A | * | 6/1926 | Putnam ....................... | 301/79 |
| D248,095 S | * | 6/1978 | Shuzuki et al. ............ | D12/209 |
| 4,153,267 A | * | 5/1979 | Hilber ..................... | 280/281.1 |
| 4,256,346 A | * | 3/1981 | Kawaguchi et al. .......... | 301/74 |
| 4,662,482 A | * | 5/1987 | Bass ......................... | 188/18 A |
| 4,716,993 A | * | 1/1988 | Bass ......................... | 188/18 A |
| D410,618 S | * | 6/1999 | Hussaini et al. ........... | D12/211 |
| D414,738 S | * | 10/1999 | Escue ........................ | D12/209 |
| D420,320 S | * | 2/2000 | Khoury ...................... | D12/209 |
| 6,042,194 A | * | 3/2000 | Fitz et al. .................... | 301/80 |
| D427,555 S | * | 7/2000 | Hall .......................... | D12/209 |
| 6,095,543 A | * | 8/2000 | McMahon et al. .......... | 280/282 |
| 6,196,638 B1 | * | 3/2001 | Mizuno et al. ............ | 301/104 |
| D445,079 S | * | 7/2001 | Lee .......................... | D12/209 |
| D451,876 S | * | 12/2001 | Kohl ......................... | D12/211 |
| D453,136 S | * | 1/2002 | Frizzi ....................... | D12/211 |
| D464,599 S | * | 10/2002 | Strader et al. ............ | D12/211 |
| 6,561,298 B2 | * | 5/2003 | Buell et al. ................ | 180/221 |

FOREIGN PATENT DOCUMENTS

| | | | |
|---|---|---|---|
| JP | 56-82601 | * | 6/1981 |
| JP | 61-22901 | * | 10/1986 |
| JP | 883999 | | 3/1994 |

OTHER PUBLICATIONS

Custom Chrome '99, Catalog p. 14.2, "Spoke".

* cited by examiner

Primary Examiner—Russell D. Stormer
(74) Attorney, Agent, or Firm—Michael Best & Friedrich LLP

(57) ABSTRACT

The present invention provides a motorcycle wheel that includes a rim, a hub, and a spoke. The rim is adapted to receive a motorcycle tire and the hub is adapted to receive and support a motorcycle axle. The spoke extends between the rim and the hub. The spoke includes first and second walls that are separated by a distance. The first and second walls are substantially entirely unconnected to each other between the hub and the rim. The spokes are all connected to the hub substantially centered about a central plane and connected to the rim on one side of the central plane.

29 Claims, 7 Drawing Sheets

LIGHTWEIGHT MOTORCYCLE WHEEL

BACKGROUND

The invention relates to motorcycle wheels, and more particularly to lightweight motorcycle wheels.

Motorcycle wheels are subject to a variety of forces during the operation of a motorcycle. The wheels are subject to normal riding forces that include the weight of the motorcycle and the forces caused by riding over bumps and potholes. The wheels are also subject to braking forces that are generated in the wheel when the brakes of the motorcycle are applied to stop the motorcycle.

If a wheel fails under such stress, the motorcycle may be rendered inoperable. It is therefore critical that the wheel be made sturdy enough to absorb the stresses encountered during the operation of a motorcycle. In an effort to prevent wheel failure, prior art wheels are constructed to be relatively heavy. A benefit of a heavier wheel is the potential for better tolerance for stress. A disadvantage of such heavy construction is added weight, resulting in diminished handling and reduced fuel efficiency for the motorcycle.

It is known to use disc brakes on a motorcycle. Disc brake assemblies include a disc or rotor mounted to a wheel, and a caliper positioned next to the rotor and capable of clamping onto the rotor to slow down the rotation of the associated wheel. Known motorcycle disc brake assemblies fall roughly into two categories. The first category includes a rotor mounted at the hub of the wheel and a caliper that clamps to the left and right faces of the rotor from the radially outer edge. This is the most common type of disc brake assembly used on existing cars and motorcycles. In operation, the braking force of the caliper and rotor is transferred from the hub, through the spokes, and to the rim of the wheel and the tire in order to bring the motorcycle to a stop. Braking forces have been historically transferred through the spokes of the wheel and therefore the spokes have been designed to withstand high stresses, usually resulting in solid spokes and heavier wheels.

The second category, a so-called "inside-out" assembly, includes a ring-shaped rotor mounted to the rim of the wheel along the rotor's radially outer edge, and a caliper that clamps the right and left faces of the rotor from the radially inner edge of the rotor. During operation, the braking forces are no longer transferred through the spokes, but instead are transferred from the rotor directly to the rim. Therefore, the braking stresses are eliminated from the spokes and the spokes are capable of a more lightweight design that need only withstand the normal riding forces associated with the motorcycle.

SUMMARY

The present invention provides a motorcycle wheel that includes a rim, a hub, and a spoke. The rim is adapted to receive a motorcycle tire, and the hub is adapted to receive and support a motorcycle axle. The spoke extends between the rim and the hub. The spoke includes first and second walls that are separated by a distance. The first and second walls are substantially entirely unconnected to each other between the hub and the rim.

The present invention also provides a motorcycle wheel that includes a rim, a hub, and spokes. The rim is adapted to receive a motorcycle tire, and the hub is adapted to receive and support a motorcycle axle. The hub defines an axis of rotation. A central plane of the wheel is perpendicular to the axis of rotation and substantially bisects the hub and the rim. The spokes connect the rim to the hub. The end of the spoke that is connected to the hub is substantially centered about the central plane, and the end connected to the rim is entirely on one side of the central plane.

Other features and advantages of the invention will become apparent to those skilled in the art upon review of the following detailed description, claims, and drawings.

BRIEF DESCRIPTION OF THE DRAWINGS

FIG. 2 is an enlarged side view of the font wheel of the motorcycle of FIG. 1.

Figure 1:
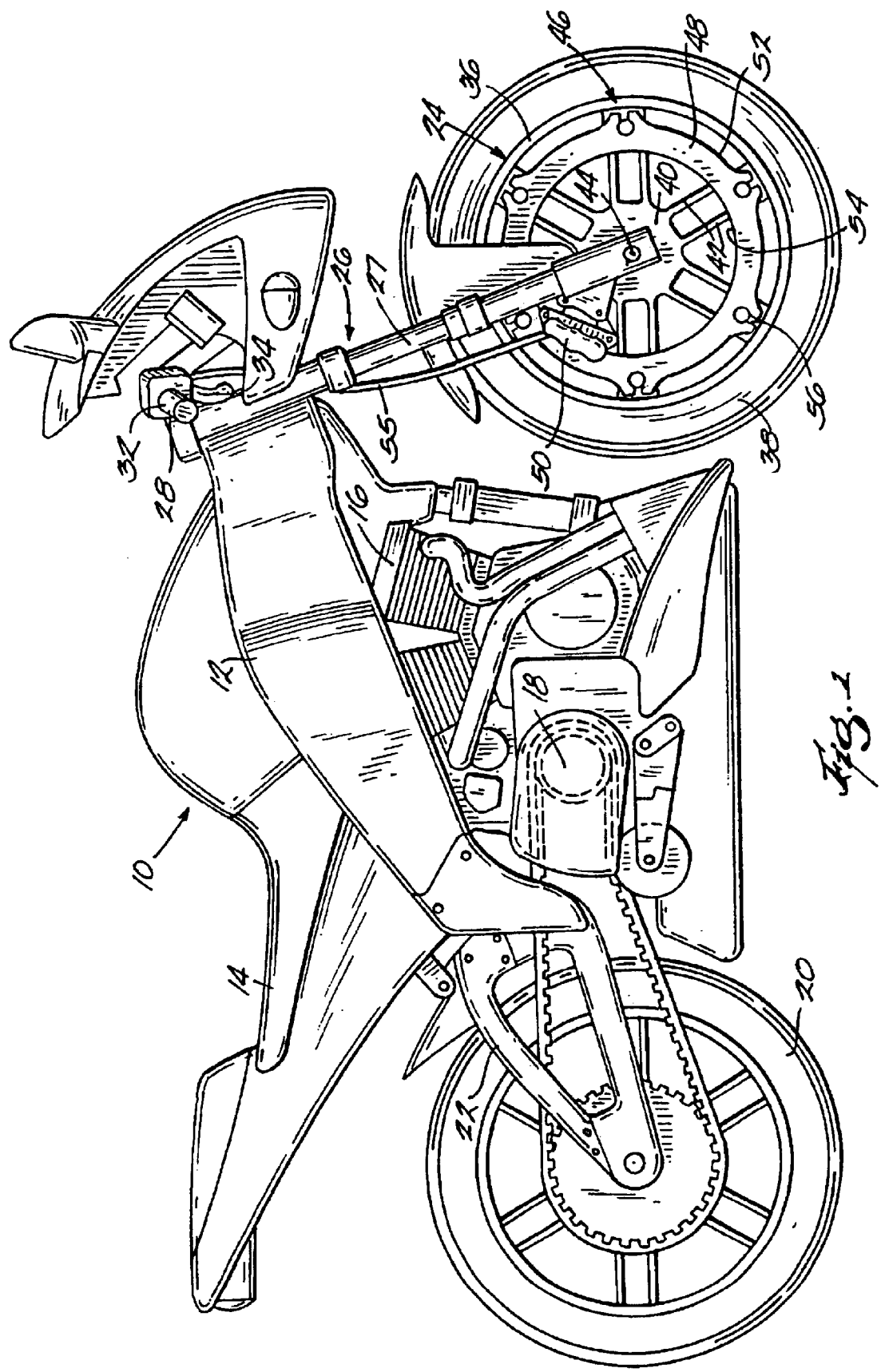
FIG. 1 is a side view of a motorcycle embodying the present invention.
Figure 1:
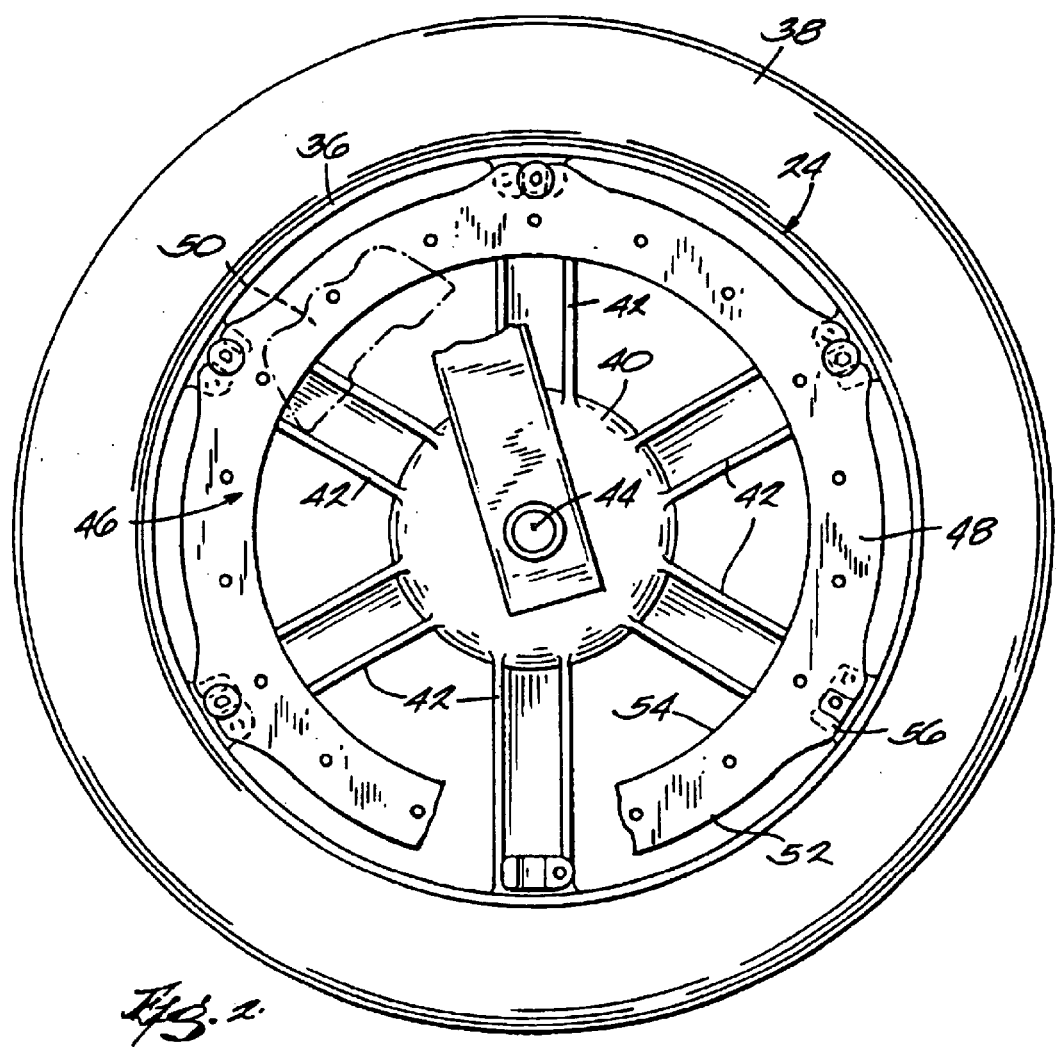

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 having a frame 12, and a seat 14, engine 16, and transmission 18 all supported by the frame 12. A rear wheel 20 is interconnected to the frame 12 with a swingarm 22, and a front wheel 24 is interconnected to the frame 12 with a steering assembly 26 including a front fork 27 and handlebars 28. Mounted to the handlebars 28 is the motorcycle control system, including a throttle 32 and a brake handle 34.

FIG. 2 is an enlarged side view of the front wheel 24 of the motorcycle 10. The front wheel 24 includes a rim 36, a tire 38 mounted to the rim 36, a hub 40, and a plurality of spokes 42 extending in a radial direction from the hub 40 to the rim 36. The front wheel 24 is mounted to the steering assembly 26 for rotation about a rotational axis 44.

An inside-out disc braking assembly 46 is mounted to the motorcycle 10 and includes a brake rotor 48 mounted to the front wheel 24 and a caliper 50 mounted to the front fork 27. A similar disc braking assembly 46 may also be provided on the rear wheel 20, or a hub-mounted rotor may be employed on the rear wheel 20. The rotor 48 is generally ring-shaped, and has a center axis, an outer edge 52, and an inner edge 54. The rotor 48 is mounted to the front wheel 24 such that the center axis is collinear with the rotational axis 44 of the front wheel 24. The rotor 48 is mounted to the rim 36 as will be described below in more detail, but could alternatively be mounted to the plurality of spokes 42 in a similar fashion.

The caliper 50 is positioned proximate to the inner edge 54 of the rotor 48. A brake cable 55 interconnects the caliper 50 and the brake handle 34 such that the caliper 50 selectively clamps onto the rotor 48 in response to actuation of the brake handle 34. Once clamped onto the rotor 48, the caliper 50 causes the rotor 48, and consequently the front wheel 24, to slow down due to the frictional engagement between the caliper 50 and the rotor 48.

Figure 3:
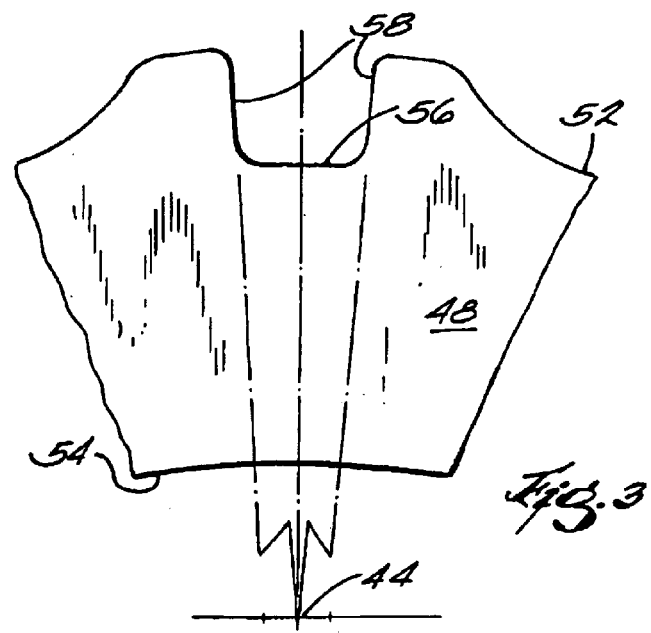
FIG. 3 is an enlarged side view of a slot in the front brake rotor of the motorcycle of FIG. 1.
Figure 4:
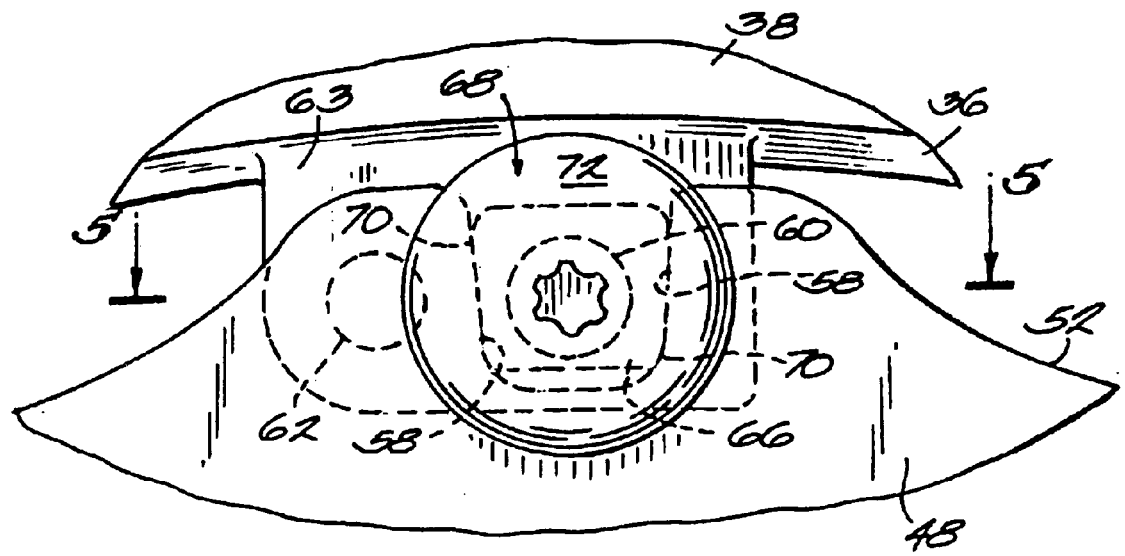
FIG. 4 is an enlarged side view of a portion of the front brake rotor and wheel.

Turning now to FIGS. 3 and 4, the rotor 48 includes a plurality of slots 56 along its outer edge 52. The illustrated slots 56 are open-ended, but may alternatively be close-ended slots. Each slot 56 includes a pair of flat edges 58 that are non-parallel to each other. The flat edges 58 preferably define lines that extend in the radial direction and converge at the hub 40 on the axis of rotation 44 of the wheel 24.

Figure 5:
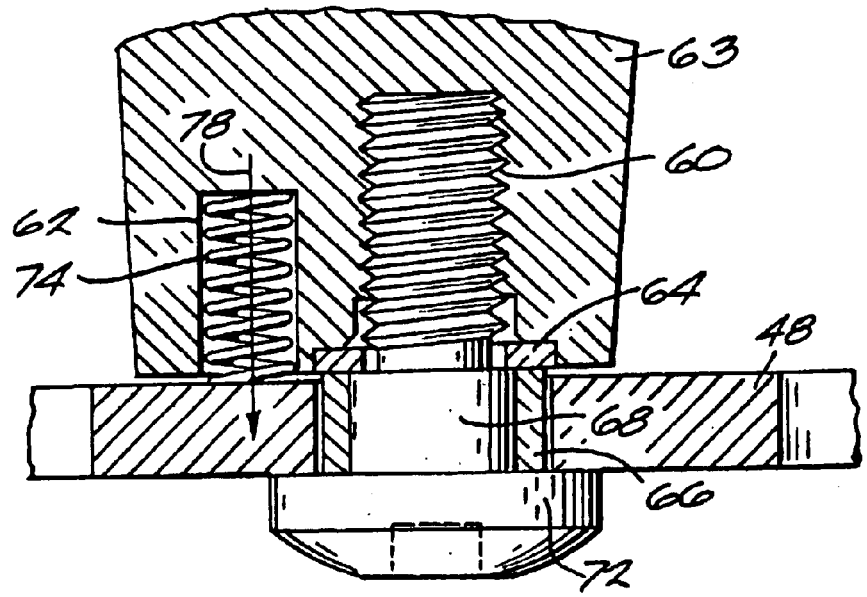
FIG. 5 is a cross-section view taken along line 5—5 in FIG. 4.
Figure 6:
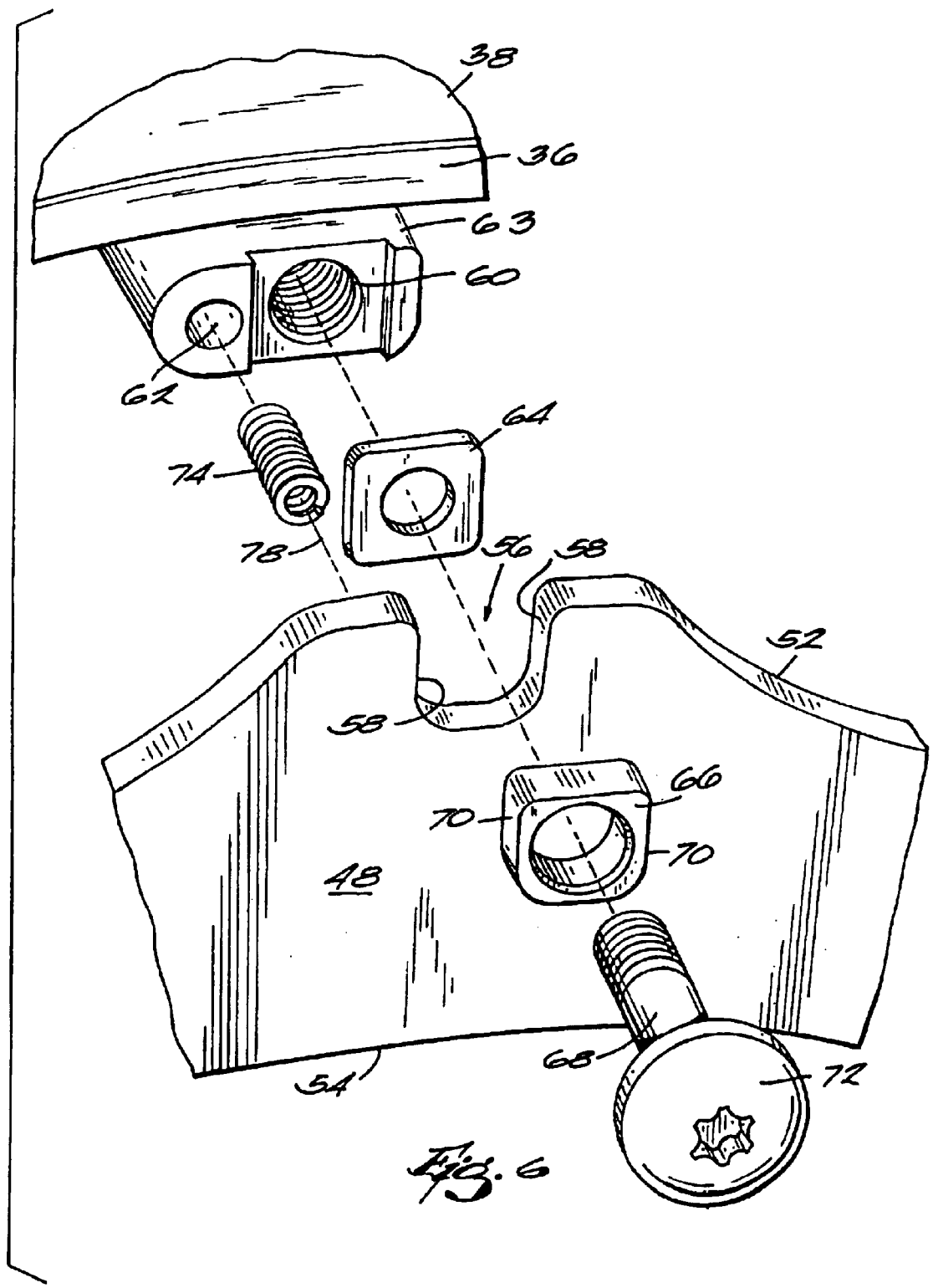
FIG. 6 is an enlarged exploded view of a portion of the front brake assembly of the motorcycle of FIG. 1.

Turning to FIGS. 5 and 6, a threaded bore 60 and a smooth blind bore 62 are provided in a boss 63 extending away from the rim 36, or alternatively from a spoke 42 of the wheel 24. The rotor 48 is mounted to the wheel 24 by way of a washer 64, a spacer 66 and a fastener 68. The spacer 66 includes flat sides 70 that are non-parallel and is shaped to fit snugly into the slot 56 in the rotor 48 such that there is contact between the flat sides 70, 58 of the spacer 66 and the slot 56 substantially along the entire length of the spacer 66. In alternative embodiments, the washer 64 and the spacer 66 may be integrally-formed with the boss 63 and wheel 24. The washer 64 and spacer 66 include through-bores that permit the fastener 68 to extend through the spacer 66 and the washer 64, and thread into the threaded bore 60 in the wheel 24. The fastener 68 includes a head 72 having a diameter larger than the width of the slot 56 and spacer 66, such that the head 72 extends beyond the sides of the spacer 66.

A biasing member, such as the illustrated coil spring 74, is inserted into the blind bore 62 in the boss 63 and is compressed between the boss 63 and the rotor 48. The spring 74 thus biases the rotor 48 away from the wheel 24 and against the head 72 of the fastener 68. The spring 74 provides a resilient suspension system for the rotor 48 that gives the rotor 48 some play, but reduces noise caused by the rotor 48 bouncing between the fastener head 72 and the wheel 24. In the illustrated embodiment, the spring 74 acts along a line of force 78 that is generally parallel to, and spaced from, the longitudinal axis of the fastener 68. In this regard, the spring 74 is offset from the fastener 68.

In operation, the non-parallel, radially-directed flat sides 58, 70 of the slot and spacer 56, 66 are in contact when the rotor 48 is cool. When the brake handles 34 are actuated, the calipers 50 pinch the rotor 48. Friction between the caliper 50 and the rotor 48 causes the rotor 48 to heat up. The rotor 48 thermally expands in the radial direction under the thermal load. As used herein, "radial direction" means the line perpendicular to the axis of rotation 44 of the wheel 24. Because the flat sides 58, 70 of the slot and spacer 56, 66 are radially-directed, the flat sides 58, 70 remain in substantially full contact with each other even as the rotor 48 thermally expands in the radial direction, and are substantially unaffected by the thermal expansion.

Figure 7:
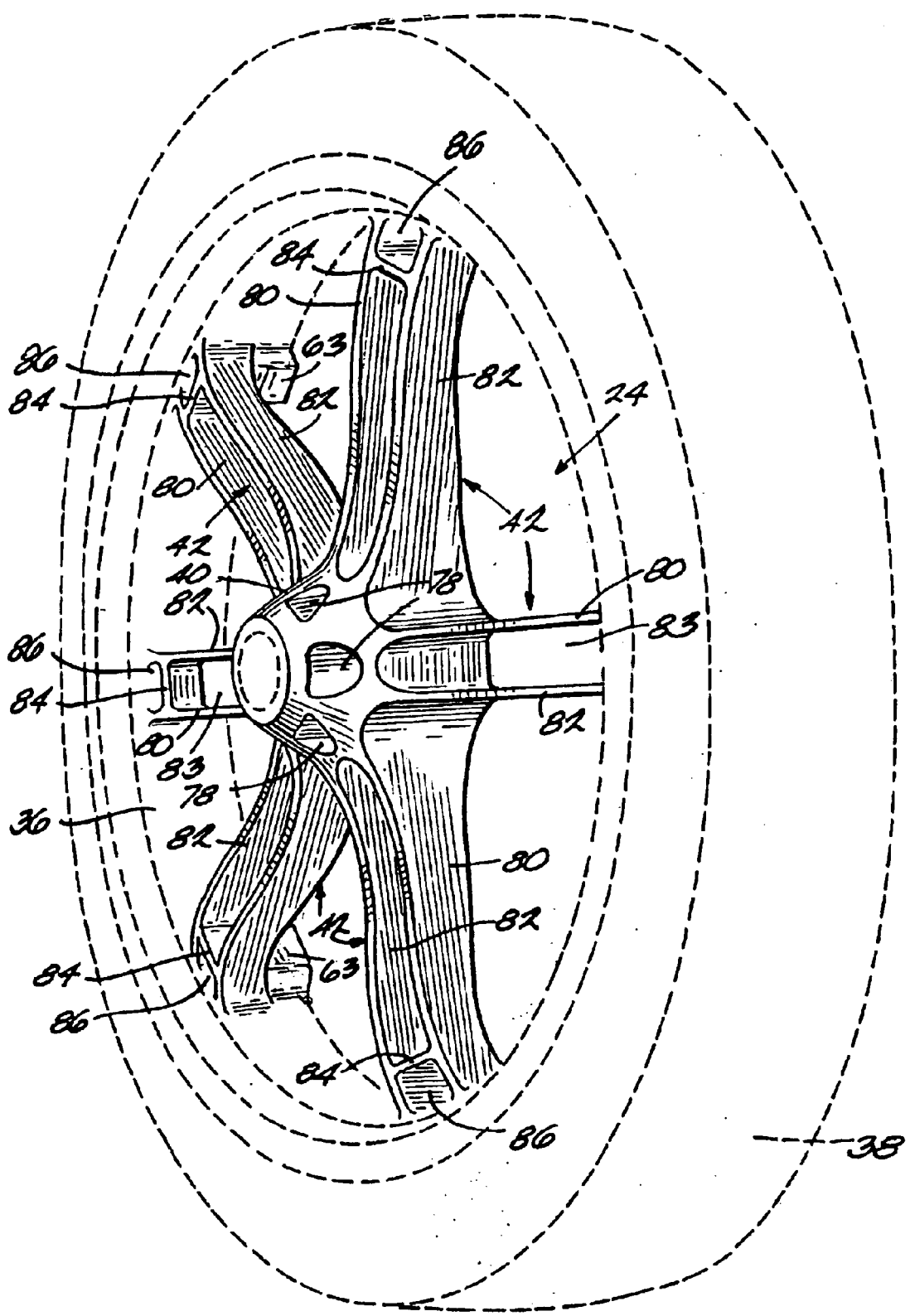
FIG. 7 is a perspective view of a front wheel of the motorcycle of FIG. 1.
Figure 8:
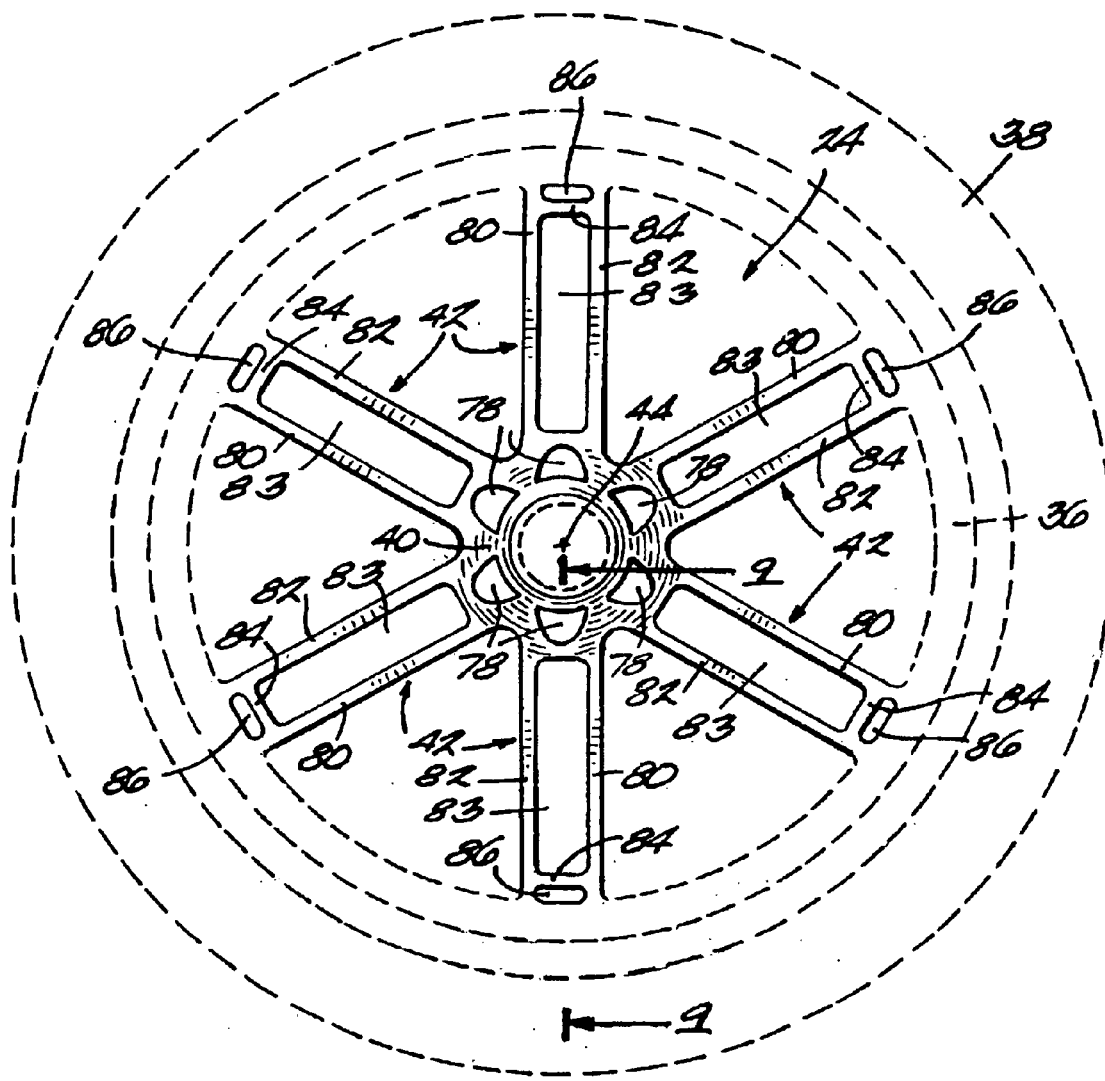
FIG. 8 is a side view of the front wheel illustrated in FIG. 7.
Figure 9:
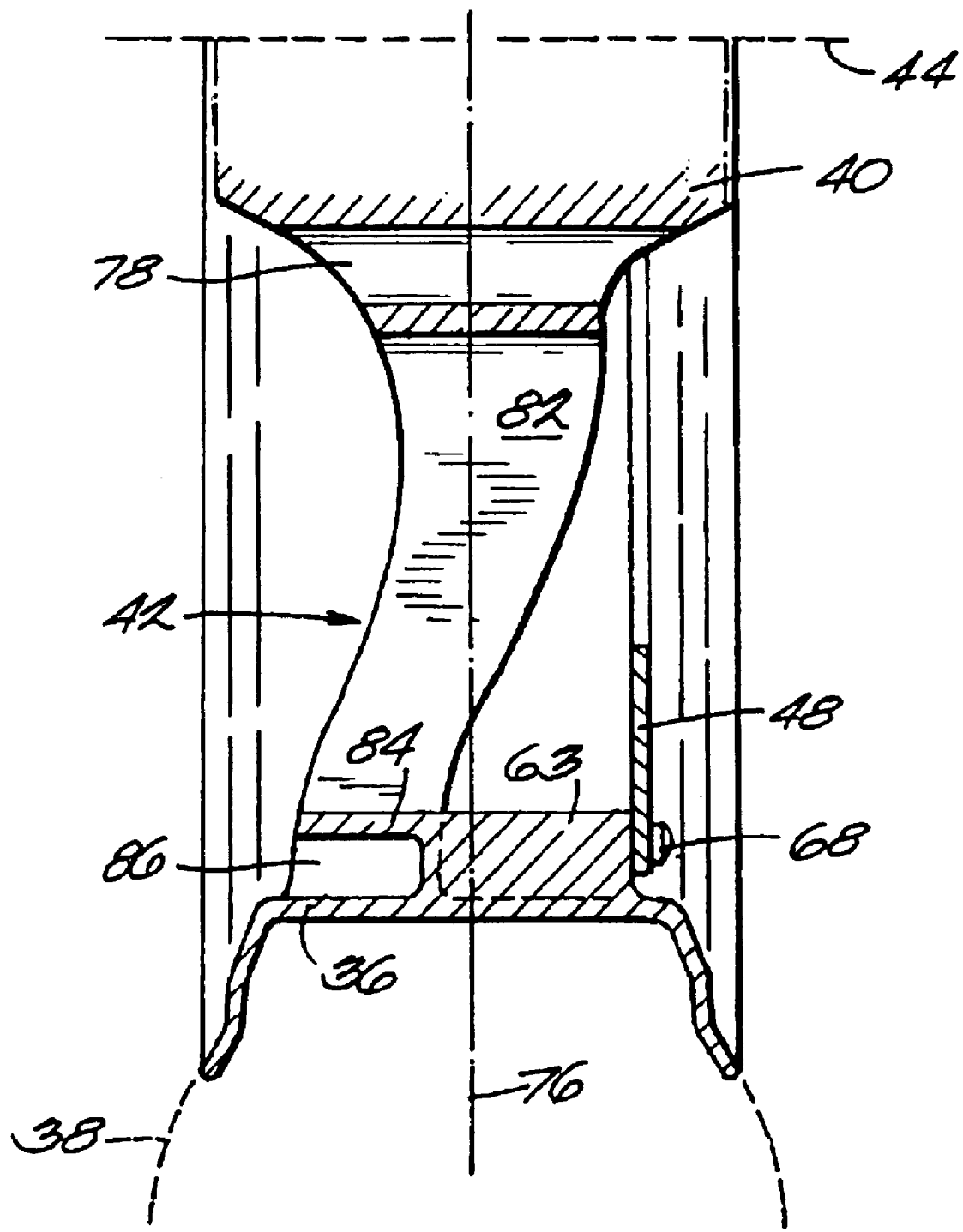
FIG. 9 is a cross-section view taken along line 9—9 in FIG. 8.

The lightweight motorcycle wheel 24 is illustrated in more detail in FIGS. 7–9. The front wheel 24 includes a total of six spokes 42 that are equally circumferentially spaced from each other and unconnected to each other between the hub 40 and the rim 36.

A central plane 76 (FIG. 9) is perpendicular to the axis of rotation 44 and bisects the rim 36 and the hub 40 into equal halves. The hub 40 includes six apertures 78 that extend generally parallel to, and are radially spaced from, the axis of rotation 44. The apertures 78 are equally circumferentially spaced relative to one another and circumferentially aligned with the spokes 42 of the wheel 24.

The phrase "circumferentially aligned", as used within the specification and the claims, is intended to define elements as being located at common angular positions relative to the axis of rotation 44. For example, an aperture 78 is circumferentially aligned with a spoke 42 when the aperture 78 is positioned about the same angular position relative to the axis of rotation as the spoke 42.

The spokes 42 each include a first wall 80 and a second wall 82 that are separated by a distance. The first wall 80 is parallel to the second wall 82 and the walls 80, 82 are substantially unconnected along their lengths between the hub 40 and the rim 36, and define an open slot 83 therebetween. The walls 80, 82 are joined at their inner ends by the hub 40. The walls 80, 82 are joined at their outer ends adjacent to the rim 36 by a gusset 84. The gusset 84 is spaced from the rim 36 and extends from the radially inward surface of the boss 63. The gusset 84, rim 36, walls 80, 82, and boss 63 define a cavity 86 that opens in a direction opposite the threaded bore. The spoke walls 80, 82 define planes, and the bosses 63 are between the planes of the associated walls 80, 82.

The first and second walls 80, 82 of the spokes 42 are substantially identical to each other. The inner ends of the walls 80, 82 that are connected to the hub 40 are centered about the central plane 76. The walls 80, 82 are curved, however, such that the outer ends that are connected to the rim 36 are all located to one side of the central plane 76. The rotor 48 is mounted to the rim 36 on the opposite side of the central plane 76, such that the central plane 76 is between the outer ends of the walls 80, 82 and the rotor 48.

It should be noted that the wheel 24 is integrally cast of aluminum. Therefore, the rim 36, hub 40, spokes 42, gussets 84, and bosses 63 are all integrally formed as a single casting.

What is claimed is:

1. A motorcycle wheel comprising:
   a rim adapted to receive a motorcycle tire;
   a hub adapted to receive and support a motorcycle axle; and
   at least one spoke extending between said rim and said hub, wherein the at least one spoke includes first and second walls that are separated by a distance, the first and second walls being substantially entirely unconnected to each other between the hub and the rim, and wherein the first and second walls are connected to each other by a rotor mounting boss adjacent to the rim.

2. The motorcycle wheel of claim 1, wherein the first wall is substantially parallel to the second wall.

3. The motorcycle wheel of claim 1, wherein the first wall is substantially identically shaped to the second wall.

4. The motorcycle wheel of claim 1, wherein the at least one spoke includes six spokes spaced at 60 degree increments around the wheel.

5. The motorcycle wheel of claim 1, wherein the at least one spoke includes a plurality of spokes, and wherein no spoke is connected to another spoke between the rim and the hub.

6. The motorcycle wheel of claim 1, wherein the hub is adapted to rotate on an axle about an axis of rotation, and wherein the hub includes at least one aperture extending generally parallel to, and radially spaced from, the axis of rotation.

7. The motorcycle wheel of claim 6, wherein the first and second walls define first and second planes, respectively, and wherein the aperture is between the first and second planes.

8. The motorcycle wheel of claim 1, wherein the rim, hub, and at least one spoke are integrally formed with each other.

9. A motorcycle wheel comprising:
a rim adapted to receive a motorcycle tire;
a hub adapted to receive and support a motorcycle axle, and adapted to rotate on the axle about an axis of rotation;
a central plane perpendicular to the axis of rotation, the central plane substantially bisecting the hub and the rim;
a plurality of spokes connecting the rim to the hub, wherein the ends of the spokes that are connected to the hub are substantially centered about the central plane, and the ends connected to the rim are entirely on one side of the central plane.

10. The motorcycle wheel of claim 9, further comprising a plurality of bosses adjacent to the rim, and a brake rotor mounted to the bosses on the other side of the central plane.

11. The motorcycle wheel of claim 10, wherein each of the plurality of bosses is circumferentially aligned with a corresponding one of the plurality of spokes.

12. The motorcycle wheel of claim 9, wherein the rim, hub, and plurality of spokes are integrally formed with each other.

13. A motorcycle wheel comprising:
a rim adapted to receive a motorcycle tire;
a hub adapted to receive and support a motorcycle axle, and adapted to rotate on the axle about an axis of rotation, wherein the hub includes apertures extending generally parallel to, and radially spaced from, the axis of rotation;
a central plane perpendicular to the axis of rotation, the central plane substantially bisecting the hub and the rim;
spokes having outer ends connected to the rim and inner ends connected to the hub, wherein the spokes include first and second walls that are separated by a distance, wherein the spokes include gussets spaced from the rim and joining the first and second walls, and wherein the first and second walls are entirely unconnected to each other between the hub and the gusset;
bosses adjacent to the rim and circumferentially aligned between first and second walls of the spokes, wherein the bosses, gussets, walls, and rim define cavities; and
a brake rotor mounted to the bosses, wherein the central plane is between the rotor and the outer ends of the spokes, and wherein the rim, hub, walls, gussets, and bosses are integrally formed together.

14. A motorcycle wheel comprising:
a rim adapted to receive a motorcycle tire;
a hub adapted to receive and support a motorcycle axle; and
at least one spoke extending between said rim and said hub, wherein the at least one spoke includes first and second walls that are separated by a distance and in facing relationship with each other, the first and second walls being substantially entirely unconnected to each other between the hub and the rim, wherein the rim, hub, and at least one spoke are integrally formed with each other, and wherein the first and second walls are connected to each other by a rotor mounting boss adjacent to the rim.

15. The motorcycle wheel of claim 14, wherein the first wall is substantially parallel to the second wall.

16. The motorcycle wheel of claim 14, wherein the first wall is substantially identically shaped to the second wall.

17. The motorcycle wheel of claim 14, wherein the at least one spoke includes six spokes spaced at 60 degree increments around the wheel.

18. The motorcycle wheel of claim 14, wherein the at least one spoke includes a plurality of spokes, and wherein no spoke is connected to another spoke between the rim and the hub.

19. The motorcycle wheel of claim 14, wherein the hub is adapted to rotate on an axle about an axis of rotation, and wherein the hub includes at least one aperture extending generally parallel to, and radially spaced from, the axis of rotation.

20. The motorcycle wheel of claim 19, wherein the first and second walls define first and second planes, respectively, and wherein the aperture is between the first and second planes.

21. The motorcycle wheel of claim 14, wherein the first wall includes an inner face, an outer face, and a thickness between the faces, wherein the second wall includes an inner face, an outer face, and a thickness between the inner and outer faces of the second wall, and wherein the inner face of the first wall faces the inner face of the second wall.

22. The motorcycle wheel of claim 21, wherein the inner face of the first wall defines a first plane and the inner face of the second wall defines a second plane, and wherein the first plane and the second plane are not coplanar with each other.

23. The motorcycle wheel of claim 21, wherein the hub is adapted to rotate on the axle about an axis of rotation, and wherein the inner face of the first wall defines a first plane, and wherein the first plane is substantially parallel to the axis of rotation.

24. The motorcycle wheel of claim 21, wherein the inner face of the first wall defines a width, and wherein the thickness of the first wall is substantially less than the width.

25. The motorcycle wheel of claim 21, wherein the thickness of the first wall is approximately $\frac{1}{6}^{th}$ of the distance between the outer faces of the first and second walls.

26. A motorcycle wheel comprising:
a rim adapted to receive a motorcycle tire;
a hub adapted to receive and support a motorcycle axle, and adapted to rotate on the axle about an axis of rotation;
a central plane perpendicular to the axis of rotation, the central plane substantially bisecting the rim;
a plurality of spokes connecting the rim to the hub, wherein the ends of the spokes that are connected to the hub intersect the central plane, and the ends connected to the rim are entirely on one side of the central plane;
a plurality of bosses adjacent to the rim; and
a brake rotor mounted to the bosses on the other side of the central plane.

27. The motorcycle wheel of claim 26, wherein each of the plurality of bosses is circumferentially aligned with a corresponding one of the plurality of spokes.

28. The motorcycle wheel of claim 26, wherein the rim, hub, and plurality of spokes are integrally formed with each other.

29. The motorcycle wheel of claim 26, wherein the axis of rotation defines an axial direction, wherein the ends of the spokes connected to the hub define a first width measured in the axial direction, and wherein the ends of the spokes connected to the rim define a second width measured in the axial direction, the second width being approximately ½ the distance of the first width.

* * * * *